Patented July 10, 1951

2,559,626

UNITED STATES PATENT OFFICE 2,559,626

DITHIANE CARBOXYLIC ACIDS

Eugene F. Jansen, Berkeley, Calif., assignor to the United States of America as represented by the Secretary of Agriculture No Drawing. Original application April 15, 1949, Serial No. 87,823. Divided and this application June 6, 1950, Serial No. 166,531

10 Claims. (Cl. 260—327)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This application is a division of my copending application Serial No. 87,823, filed Apr. 15, 1949 issued January 30, 1951, as Patent No. 2,539,428.

This invention relates to organic sulphur compounds, in particular to 1,3-dithiane-5-carboxylic acids which compounds may be considered as derivatives of 3,3-dithiolisobutyric acid. One object of this invention is the provision of novel organic sulphur compounds and methods of preparing them. Further objects will be apparent from the description herein.

The products of this invention, the 1,3-dithiane-5-carboxylic acids, may be represented by the formula:

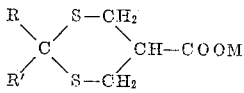

wherein R and R' are radicals selected from the group consisting of hydrogen and hydrocarbon and M is a cation.

The compound, 3,3'-dithiolisobutyric acid has the chemical formula:

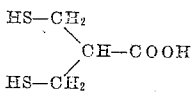

As disclosed in my prior application identified above, 3,3'-dithiolisobutyric acid can be prepared, for example, by reduction of the disulphide compound naturally occurring in asparagus or by reaction of a 3,3'-dihaloisobutyric acid with an inorganic hydrosulphide. 3,3'-dithiolisobutyric acid can be converted into its salts by reaction with suitable hydroxides, carbonates, or other inorganic compounds. For example, the sodium salt of the dithiol acid can be prepared by reacting it with sodium hydroxide or sodium carbonate. In the same manner any desired salt can be prepared by the usual neutralization or metathetic techniques. Salt formation is not limited to inorganic salts as salts may also be made with organic bases such as amines, quaternary ammonium compounds, ternary sulphonium compounds, for example, methyl amine, triethanol amine, glyceryl amine, aniline, morpholine, brucine, strychnine, pyridine, piperidine, tetraethyl ammonium hydroxide, dodecyl trimethyl ammonium hydroxide, triethyl sulphonium hydroxide, and so forth.

The novel compounds of this invention, 1,3-dithiane-5-carboxylic acid, its salts and the 2-substituted derivatives thereof, are prepared by reacting 3,3'-dithiolisobutyric acid with an aldehyde or ketone, preferably in the presence of an inorganic acid such as hydrochloric, sulphuric or hydrobromic acid. The reactions whereby these compounds are produced can be illustrated by the following equations:

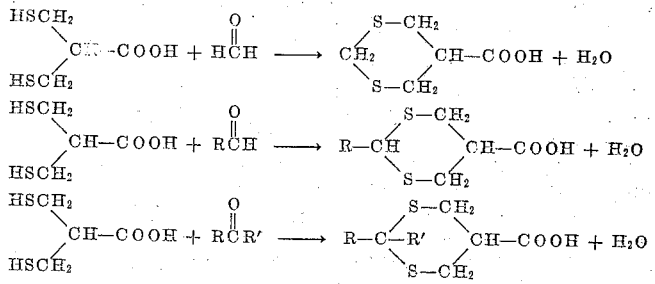

wherein R and R' are hydrocarbon radicals.

It is evident from the above equations that any desired derivative can be prepared by selection of the proper aldehyde or ketone. Thus, to prepare 1,3-dithiane-5-carboxylic acid the proper reactant is formaldehyde. This synthesis is illustrated by Example III herein. To prepare 1,3-dithiane-2,2-dimethyl-5-carboxylic acid the proper reactant is acetone; to prepare 1,3-dithiane-2-methyl-5-carboxylic acid the proper reactant is acetaldehyde. Use may be made of any aldehyde or ketone such as propionaldehyde, butyraldehyde, isobutyraldehyde, valeraldehydes, benzaldehyde, methyl ethyl ketone, methyl propyl ketone, diethyl ketone, acetophenone, and so forth.

The dithiane carboxylic acids can be converted into salts in the same manner and with the same materials as set forth above in connection with salts of 3,3'-dithiolisobutyric acid itself.

The compounds prepared in accordance with this invention are useful as intermediates for the preparation of diverse types of derivatives.

The following examples are illustrative of the invention:

EXAMPLE I

Isolation of the asparagus disulphide compound

A supply of asparagus concentrate was procured. This concentrate was prepared by evaporating the juice pressed from asparagus butts until the solids content was 62.5 percent. A 9 gallon sample of the concentrate (40 kilos) was diluted with an equal weight of water. This solution, which had a pH of 4.5, was extracted with 7 gallons of butanol by agitation for 20 minutes. After standing for 2 hours the liquid was centrifuged, the butanol phase thus being separated from the aqueous phase. The butanol phase was then extracted with 3 gallons of dilute aqueous sodium bicarbonate solution (4 lbs. NaHCO$_3$ per gallon). The bicarbonate extract was separated and acidified to pH 3 with phosphoric acid, and extracted with 4 gallons of butanol. The butanol extract was evaporated at 35° C. and under vacuum to a volume of 270 ml. This concentrate was filtered and to it was added 1300 ml. of benzene, and the precipitated material removed by filtration. The butanol-benzene solution was then extracted with 550 ml. of 5 percent sodium bicarbonate solution; the bicarbonate solution was washed with benzene, and then acidified to pH 2 with sulphuric acid. Some sticky black insoluble material was removed by filtration and centrifugation. The bicarbonate solution was then extracted with 3 liters of ether and the ether extract dried over anhydrous sodium sulphate and then evaporated to a volume of 100 ml. This ether solution contained 31.7 grams of the disulphide compound.

EXAMPLE II

Reduction of the asparagus disulphide compound to 3,3'-dithiolisobutyric acid To 175 ml. of liquid ammonia was added 13 ml. of the ethereal solution prepared in accordance with Example I above, this ether solution containing 4.1 grams of the disulphide compound.

Metallic sodium was added in small pieces until a relatively permanent blue color was obtained. As the reduction proceeded the material went into solution. The ammonia was allowed to evaporate spontaneously. The residue was taken up in 40 ml. of water and quickly acidified with concentrated hydrochloric acid to pH 2. This aqueous material was frozen, then dried under vacuum. The residue was allowed to stand overnight with 600 ml. of petroleum ether (B. P. 92–100°) and then re-extracted with 200 ml. of petroleum ether. The combined petroleum ether extract was cooled to —18° for several days. Colorless crystals of 3,3'-dithiolisobutyric acid separated. Upon recrystallization from 800 ml. of petroleum ether, 1.97 grams of 3,3'-dithiolisobutyric acid was obtained corresponding to a 48 percent yield on a solid basis. The product melted at 61–62°.

Analysis: C$_4$H$_8$O$_2$S$_2$.

Calculated: C, 31.56; H, 5.30; S, 42.12, mol. wt., 152.

Found: C, 32.3; H, 5.30; S, 41.6, neutral equivalent, 152; mol. wt. 155; equivalent weight by —SH titration, 77.

EXAMPLE III

Preparation of 1,3-dithiane-5-carboxylic acid

To a solution of 0.25 gram (.0016 mole) of 3,3'-dithiolisobutyric acid in 50 ml. of 0.1 normal hydrochloric acid was added 0.14 ml. of formalin (.0019 mole of formaldehyde) and the reaction mixture was refluxed for two hours. The reaction mixture was then evaporated to dryness under vacuum whereupon a crystalline residue was obtained. The crystals were recrystallized from 12 ml. of hot water and a yield of 0.19 gram (70 percent of theoretical) of 1,3-dithiane-5-carboxylic acid was obtained. The product had a melting point of 146–148° C.

Analysis: C$_5$H$_8$O$_2$S$_2$.

Calculated: C, 36.56%; H, 4.91%; S, 39.04%; mol. wt. 164.

Found: C, 36.7%; N, 5.04%; S, 39.8%; neutral equivalent, 161.

Having thus described the invention, I claim:

1. A compound of the formula

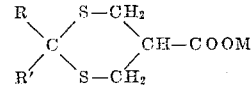

wherein R and R' are radicals selected from the group consisting of hydrogen, alkyl, and phenyl and M is a cation.

2. The compound of claim 1 wherein R, R', and M are each hydrogen.

3. The compound of claim 1 wherein R is alkyl and R' and M are each hydrogen.

4. The compound of claim 1 wherein R is methyl and R' and M are each hydrogen.

5. The compound of claim 1 wherein R and R' are both alkyl and M is hydrogen.

6. The compound of claim 1 wherein R and R' are both methyl and M is hydrogen.

7. A process for preparing a dithiane carboxylic acid corresponding to the formula

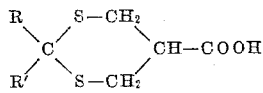

wherein R and R' are radicals selected from the group consisting of hydrogen, alkyl, and phenyl comprising reacting 3,3'-dithiolisobutyric acid with a compound of the formula

wherein R and R' have the same significance as above.

8. A process of preparing 1,3-dithiane-5-carboxylic acid comprising reacting 3,3'-dithiolisobutyric acid with formaldehyde.

9. A process of preparing 1,3-dithiane-2-methyl-5-carboxylic acid comprising reacting 3,3'-dithiolisobutyric acid with acetaldehyde.

10. A process of preparing 1,3-dithiane-2,2-dimethyl-5-carboxylic acid comprising reacting 3,3'-dithiolisobutyric acid with acetone.

EUGENE F. JANSEN.

REFERENCES CITED

The following references are of record in the file of this patent:

Jansen: J. Biol. Chem. 176, pp. 657–664 (1948).

Marvel: J. Am. Chem. Soc., 72, pp. 2106–2108 (1950).